United States Patent Office 3,793,252
Patented Feb. 19, 1974

3,793,252
VULCANIZABLE COMPOSITIONS
Patrick Joseph Corish and Malcolm Cedric Kirkham, Sutton Coldfield, and Brian David William Powell, Coventry, England, assignors to Dunlop Holdings Limited, London, England
No Drawing. Filed Oct. 26, 1971, Ser. No. 192,670
Claims priority, application Great Britain, Nov. 12, 1970, 53,802/70
Int. Cl. C08c 11/48, 11/58; C08d 9/00
U.S. Cl. 260—77.5 CR
16 Claims

ABSTRACT OF THE DISCLOSURE

A vulcanizable rubber composition which comprises a natural and/or synthetic rubber containing an adduct of a poly(isocyanate/uredione) compound and a substituted aromatic compound, the substituents including a nitroso group and a hydroxyl group, the adduct being capable of dissociating under vulcanizing conditions. Preferably, the adduct does not decompose below 100° C. The poly(isocyanate/uredione) compound is preferably a diisocyanate dimer. The adduct is normally present in an amount of from 0.25 to 12 parts by weight per 100 parts by weight of rubber.

---

This invention relates to vulcanizable compositions.

It is known that the vulcanizates which have been vulcanized by a sulphur system suffer from reversion and there have been many attempts to overcome this problem while still maintaining the desirable properties of sulphur vulcanizates.

It has previously been proposed to vulcanize natural rubber using an adduct of toluene-2,4-diisocyanate or dicyclohexylmethane - 4,4'-diisocyanate and p-nitrosophenol with toluene - 2,4 - diisocyanate or dicyclohexylmethane-4,4'-diisocyanate and a dithiocarbamate.

Processing of such rubber stocks is difficult owing to their tendency to scorch, i.e. they undergo prevulcanization during processing such as extruding, calendering and the like.

Furthermore, the presence of free diisocyanates leads to the deterioration of uncured stocks.

According to one aspect of the present invention a vulcanizable rubber composition comprises a natural and/or synthetic rubber containing an adduct of a poly(isocyanate/uredione) compound and a substituted aromatic compound, the subsituents including a nitroso group and a hydroxyl group, the adduct being capable of dissociating under vulcanizing conditions.

Preferably, the nitroso group and the hydroxyl group in the substituted aromatic compound are in para- positions.

The vulcanizable composition can be based on natural and/or synthetic rubber, and suitable synthetic rubbers include polyisoprene, polychloroprene, polybutadienes and butadiene copolymers. If desired, blends of two or more synthetic rubbers may be used and polybutadienes may be blended, for example with a rubber of low unsaturation, for example an ethylene/propylene terpolymer.

The adducts of the present invention are suitable for vulcanizing rubber compositions which contain a wide range of carbon blacks and typical carbon blacks which may be used include fast extrusion furnace, intermediate super abrasion furnace, super abrasion furnace and medium processing channel. The amount of carbon black which is incorporated into the composition will vary and will depend on the rubber or rubbers used.

If desired, the rubber composition may include extender oils and/or plasticizers The adduct of the substituted aromatic compound and the poly(isocyanate/uredione) compound is normally present in an amount of from 0.25 to 12 parts by weight, preferably from 1 to 10 parts by weight, more preferably from 3 to 8 parts by weight per 100 parts by weight of rubber. The substituted aromatic compound may be, for example p-nitrosophenol, 3-methyl-4-nitrosophenol, 2-methyl-4-nitrosophenol or 2,6-dimethyl-4-nitrosophenol.

The poly(isocyanate/uredione) compound is preferably a diisocyanate dimer and examples of suitable diisocyanate dimers include toluene-2,4-diisocyanate dimer and diphenylmethane-4,4'-diisocyanate dimer.

If desired, the adduct of the present invention may be encapsulated to provide a physical barrier whereby the adduct is not released until the material encapsulating the adduct melts. Thus if the material does not melt until 100–130° C. it is possible to more carefully control the scorch of the composition.

Preferably the particles of adduct are provided with a sheath over at least 50 percent of its surface, more preferably at least 90 percent.

Preferably, the sheath material is compatible with the other constituents of the vulcanizable composition and suitable materials are polyethylene, polypropylene and polyisoprene.

In order to obtain vulcanizates of even cure, the particle size of the adduct is preferably small, for example $1\mu$ and the encapsulating material needs to be present in minor amounts.

The adduct may be encapsulated by a number of techniques, for example by adding the adduct to a solution of the sheath material, adding the adduct to a molten sheath material or by a solvent-non-solvent technique.

The composition may also contain an activator such as a dithiocarbamate, for example zinc or cadmium dimethyl dithiocarbamate or diethyl dithiocarbamate. The dithiocarbamate may be present in an amount of from 0.1 to 5 parts by weight, preferably from 0.25 to 3 parts by weight per 100 parts by weight of rubber. Other activators such as 2,2' - benzothiazyl disulphide and 2-morpholinothiobenzothiazole are typical alternatives to dithiocarbamates.

In order for the rubber composition to become efficiently vulcanized it is necessary for the adduct to decompose to release two molecules of polyisocyanate and two molecules of substituted aromatic compound. It is to be preferred that the adduct does not decompose below 100° C., more preferably not below 120° C. in order to avoid prevulcanization. Ideally the adduct should not decompose until vulcanization or near vulcanization temperatures are reached.

While it is not normally necessary to include a free polyisocyanate in the composition, and indeed it is normally preferred that one is not included since it may increase the tendency for the composition to scorch, and for the uncured stocks to deteriorate, it may sometimes be necessary where it is desired to improve the properties of the cured composition. The free polyisocyanate may be present in an amount of from 0.1 to 8 parts by weight, preferably from 0.25 to 5 parts by weight per 100 parts by weight of rubber.

The polyisocyanate is preferably a diisocyanate, for example dicyclohexylmethane-4,4'-diisocyanate, toluene-2,4-diisocyanate or diphenylmethane-4,4'-diisocyanate.

The composition may also contain a masked polyisocyanate as an alternative to, or in addition to, a free polyisocyanate.

A masked polyisocyanate is a compound which is masked by a masking agent and which preferably liberates free polyisocyanate at a temperature of at least 100° C.

Thus, the polyisocyanate would be liberated only when the composition is heated to a temperature of 100° C. or more, which would normally occur only during the vulcanization process.

The masked polyisocyanate may be made by pre-reacting a polyisocyanate with an aliphatic, aromatic or alkyl aromatic hydroxy compound to form a polyurethane compound. Suitable hydroxy compounds are phenols and alcohols, including substituted phenols such as cresols, resorcinol, hydroquinone, phloroglucinol, 2,4-dihydroxytoluene, 2,5-dihydroxytoluene.

Preferably, the hydroxy compound is present in slight excess in order to prevent any free isocyanate groups occurring in the masked polyisocyanate.

Whilst the decomposition temperature of the masked polyisocyanate should preferably not be lower than 100° C., it is more preferable that it should not be lower than 120° C.

The polyisocyanate used to prepare the masked polyisocyanate is preferably a diisocyanate, for example dicyclohexylmethane-4,4'-diisocyanate, toluene - 2,4 - diisocyanate or diphenylmethane-4,4'-diisocyanate. If desired, mixtures of polyisocyanates may be used.

Masked polyisocyanates which may be used are diphenyl urethane of diphenylmethane-4,4'-diisocyanate, diethyl urethane of diphenylmethane-4,4'-diisocyanate and diethyl urethane of toluene-2,4-diisocyanate.

In addition, partly masked polyisocyanate can be used, such as the dimer of toluene-2,4-diisocyanate which is available commercially as Desmodur TT.

A further example of a completely masked diisocyanate is a diphenyl urethane of toluene-2,4-diisocyanate dimer. The masking is partly due to urethane formation and partly due to the uredione ring.

The masked polyisocyanate may be present, for example, as 0.1 to 10 parts by weight, preferably 0.25 to 8 parts by weight per 100 parts by weight of rubber.

By using the adduct of the present invention it is possible to reduce the rate of scorch of compounded stocks, the deterioration on ageing of the uncured stocks and the toxic hazards which are associated with free isocyanates.

Vulcanizable compositions of the present invention find application in products with thick wall sections such as giant tires where reversion of normal sulphur systems is a problem and in other products where short high temperature vulcanization cycles are employed.

The invention is illustrated by the following examples in which all parts are parts by weight:

EXAMPLE I

In this example a diisocyanate dimer/p-nitrosophenol adduct was compared with a diisocyanate/p-nitrosophenol adduct and free diisocyanate.

The following formulation was prepared:

|   | Parts |
|---|---|
| Natural rubber | 100 |
| High abrasion furnace carbon black | 50 |
| Naphthenic oil [1] | 5.0 |
| Calcium oxide:wax/oil dispersion [2] (75:25) | 5.0 |

[1] Available commercially as Edilex 27.
[2] Available commercially as Caloxol W3.

|   | 1 | 2 |
|---|---|---|
| Diphenylmethane-4,4'-diisocyanate/p-nitrosophenyl adduct | 4 | |
| Toluene-2,4-diisocyanate dimer p-nitrosophenol adduct | | 4.8 |
| Diphenylmethane-4,4'-diisocyanate | 3 | |
| Zinc diethyl dithiocarbamate | 2 | 2 |
| Mooney at 120° C.: | | |
|   Plasticity (minimum) | 72 | 47 |
|   Scorch (minutes) | 2.9 | 8.9 |
| Cure, 55' at 160° C. | | |
| Tensile strength (kg./cm.²) | 243 | 223 |
| Elongation, percent | 390 | 406 |
| Hardness (° BS) | 63 | 58 |
| Resilience (Tripsometer) at 50° C., percent | 68 | 67 |
| Modulus at— | | |
|   100 percent (kg./cm.²) | 30 | 28 |
|   200 percent (kg./cm.²) | 86 | 82 |
|   300 percent (kg./cm.²) | 164 | 155 |

The two adduct levels are such that equivalent amounts of p-nitrosophenol are available. Even though the level of available diisocyanate in Compound 2 is less than Compound 1, the level of physical properties is comparable, while the scorch delay is improved using Compound 2. Furthermore, the plasticity of Compound 2 is lower.

EXAMPLE II

This example is similar to Example I except that free or partially masked isocyanate was added to the compounds containing diisocyanate dimer/p-nitrosophenol adduct. The rubber formulation was the same as in Example I.

|   | 1 | 2 | 3 |
|---|---|---|---|
| Diphenylmethane-4,4'-diisocyanate/p-nitrosophenol | 4 | | |
| Toluene-2,4-diisocyanate dimer/p-nitrosophenol adduct | | 4.8 | 4.8 |
| Diphenylmethane-4,4'-diisocyanate | 3 | 1 | |
| Toluene-2,4-diisocyanate dimer [1] | | | 0.7 |
| Zinc diethyl dithiocarbamate | 2 | 2 | 2 |
| Mooney at 120° C.: | | | |
|   Plasticity (minimum) | 72 | 55 | 57 |
|   Scortch (minutes) | 2.9 | 7.4 | 9.5 |
| Cure, 55' at 160° C. | | | |
| Tensile strength (kg./cm.²) | 243 | 218 | 229 |
| Elongation, percent | 390 | 453 | 373 |
| Hardness (° BS) | 63 | 62 | 62 |
| Resilience (Tripsometer) at 50° C., percent | 68 | 70 | 70 |
| Modulus at— | | | |
|   100 percent (kg./cm.²) | 30 | 28 | 33 |
|   200 percent (kg./cm.²) | 86 | 85 | 95 |
|   300 percent (kg./cm.²) | 164 | 166 | 175 |

[1] Available commercially as Desmodur TT.

Equivalent amounts of p-nitrosophenol and total available diisocyanate are present in all the compounds. The stocks containing toluene-2,4-diisocyanate dimer/p-nitrosophenol adduct have improved scorch and closely comparable vulcanizate physical properties relative to the control (Compound 1). Using the vulcanization system of the present invention (Compounds 2 and 3) the plasticity is lower.

EXAMPLE III

In this example vulcanizable compositions of the present invention are compared with a typical accelerated sulphur composition.

|   | 1 | 2 | 3 |
|---|---|---|---|
| Natural rubber | 100 | 100 | 100 |
| High abrasion furnace carbon black | 50 | 50 | 50 |
| Mineral oil | 5.0 | 5.0 | 5.0 |
| Zinc oxide | 5.0 | | |
| Stearic acid | 2.0 | | |
| N-cyclohexylbenzothiazole-2-sulphenamide [1] | 0.5 | | |
| Sulphur | 2.5 | | |
| N-isopropyl-N'-phenyl-p-phenylenediamine [2] | 1.0 | | |
| Calcium oxide:wax/oil dispersion [3] (75:25) | | 5.0 | 5.0 |
| Cadium diethyl dithiocarbamate | | 2.0 | 2.0 |
| Toluene-2,4-diisocyanate dimer/p-nitrosophenol adduct | | 6.0 | |
| Toluene-2,4-diisocyanate dimer/3-methyl-4-nitrosophenol aduct | | | 6.3 |
| Mooney at 120° C.: | | | |
|   Plasticity (minimum) | 60 | 62 | 42 |
|   Scorch (minutes) | 15 | 8 | 26 |
| Cure | (4) | (5) | (5) |
| Tensile strength (kg./cm.²) | 276 | 241 | 259 |
| Elongation, percent | 462 | 434 | 429 |
| Microhardness (° BS) | 59 | 62 | 59 |
| Resilience (Tripsometer) at 50° C., percent | 73 | 72 | 68 |
| Modulus at— | | | |
|   100 percent (kg./cm.²) | 34 | 34 | 33 |
|   300 percent (kg./cm.²) | 173 | 173 | 178 |
| Compression set, 24 hrs. at 70° C., percent | 34 | 19 | 20 |

[1] Available commercially at Santocure.
[2] Available commercially as Santoflex IP.
[3] Available commercially as Caloxol W3.
[4] 15' at 134° C.
[5] 55' at 160° C.

Both Compositions 2 and 3 contain no free isocyanate groups, and afford good storage stability and reasonable scorch protection; formulation 3 is particularly desirable. Normal vulcanizate properties obtained from these compositions are equivalent to those obtained with the conventional accelerated sulphur system.

Hot air aging (24 hrs. at 100° C.) data, presented in the table below, show the superior aging resistance of Composition 3 relative to the accelerated sulphur-cured compound.

HOT AIR OVEN AGING 24 HOURS AT 100° C.

| Composition | 1 | 3 |
|---|---|---|
| Percent tensile strength retained | 31 | 68 |
| Percent elongation at break retained | 37 | 77 |

EXAMPLE IV

This example illustrates the use of an encapsulated adduct of a poly(isocyanate/uredione) compound and a substituted aromatic compound.

A toluene-2,4-diisocyanate dimer/p-nitrosophenol adduct was encapsulated by the following technique:

A solution of low density polyethylene was formed using xylene as the solvent and then the required quantity of the adduct in powder form was added to the hot polyethylene with high speed stirring. The stirring was continued until a completely homogeneous solution was obtained. Stirring was then stopped and the solution allowed to cool giving a fine precipitate of the encapsulated adduct. Ether was then added to the solution to prevent agglomeration of the particles. The mixture was then centrifuged and the liquid decanted off. The encapsulated adduct was washed with ether, at each stage the ethereal solution being centrifuged and the remaining ether decanted. The material was then air dried for 15 minutes to remove excess ether and then finally dried under vacuum. The encapsulated material contained 75 percent of adduct.

The following formulation was prepared:

| | Parts |
|---|---|
| Natural rubber | 100 |
| High abrasion furnace | 50 |
| Process oil | 5.0 |
| Calcium oxide:wax/oil dispersion (75:25)[1] | 10.0 |
| Zinc diethyl dithiocarbamate | 2.0 |

[1] Available commercially as Caloxol W3.

To two samples of the above formulation was added (A) non-encapsulated adduct and (B) adduct encapsulated with low density polyethylene in an amount to give 6.0 parts adduct.

The following results were obtained:

| | A | B |
|---|---|---|
| Mooney at 120°C.: | | |
| Plasticity | 59.5 | 50.5 |
| Scorch (minutes) | 9.0 | 13.5 |

The results show that the encapsulated adduct compound of 75 percent adduct/25 percent LPDE gives a significant increase in Mooney scorch time.

Having now described our invention—what we claim is:

1. A vulcanizable rubber composition which comprises an olefinically unsaturated rubber being a homopolymer or a copolymer of a diene and an adduct of a polyisocyanate dimer compound and a substituted aromatic compound having a nitroso group substituent and a hydroxyl group substituent, the adduct being capable of dissociating under vulcanizing conditions.

2. A composition according to claim 1 in which the adduct is present in an amount of from 0.25 to 12 parts by weight per 100 parts by weight of rubber.

3. A composition according to claim 2 in which the adduct is present in an amount of from 1 to 10 parts by weight per 100 parts by weight of rubber.

4. A composition according to claim 3 in which the adduct is present in an amount of from 3 to 8 parts by weight per 100 parts by weight of rubber.

5. A composition according to claim 1 in which the nitroso group and the hydroxyl group in the substituted aromatic compound are in para- positions.

6. A composition according to claim 1 in which the substituted aromatic compound is p-nitrosophenol, 3-methyl-4-nitrosophenol, 2-methyl-4-nitrosophenol or 2,6-dimethyl-4-nitrosophenol.

7. A composition according to claim 1 in which the polyisocyanate dimer compound is a diisocyanate dimer.

8. A composition according to claim 7 in which the diisocyanate dimer is toluene-2,4-diisocyanate dimer or diphenylmethane-4,4'-diisocyanate dimer.

9. A composition according to claim 1 in which the adduct is at least partially encapsulated with a sheath material providing a physical barrier whereby the adduct is not released until the material melts.

10. A composition according to claim 1 in which the adduct dissociates above 100° C.

11. A composition according to claim 10 in which the adduct dissociates above 120° C.

12. A composition according to claim 1 which includes zinc dimethyl dithiocarbamate or diethyl dithiocarbamate.

13. A composition according to claim 1 which includes cadmium dimethyl dithiocarbamate or diethyl dithiocarbamate.

14. A rubber composition adapted to vulcanize upon heating comprising a vulcanizable natural or synthetic rubber being a homopolymer or a copolymer of a diene and the adduct formed by reaction of the —NCO groups of a polyisocyanate dimer with a hydroxyl group of an aromatic nitroso compound, said adduct being adapted to dissociate into a polyisocyanate and an aromatic nitroso compound having a hydroxyl group at vulcanizing temperatures.

15. A method for cross-linking an olefinically unsaturated natural or synthetic rubber being a homopolymer or a copolymer of a diene which comprises mixing the rubber with the adduct formed by reaction of the —NCO groups of a polyisocyanate dimer with a hydroxyl group of an aromatic nitroso compound, said adduct being adapted to dissociate into a polyisocyanate and an aromatic nitroso compound having a hydroxyl group at vulcanizing temperatures, and heating the mixture until it is cross-linked.

16. A vulcanizable rubber composition which comprises an olefinically unsaturated rubber being a homopolymer or a copolymer of a diene and an adduct of an aromatic diisocyanate dimer and a substituted aromatic compound having a nitroso group substituent and a hydroxyl group substituent, the adduct being capable of dissociating under vulcanizing conditions.

References Cited

UNITED STATES PATENTS

| 2,598,209 | 5/1952 | Bartram | 260—787 |
| 2,929,800 | 3/1960 | Hill, Jr. | 260—77.5 AM |
| 3,329,650 | 7/1967 | Abin | 260—41.5 |
| 3,351,676 | 11/1967 | Saunders | 260—859 |
| 3,645,980 | 2/1972 | Baker | 260—77.5 CR |
| 3,674,746 | 7/1972 | Lohse | 260—75 NP |

JAMES A. SEIDLECK, Primary Examiner

C. A. HENDERSON, JR., Assistant Examiner

U.S. Cl. X.R.

260—47 UP, 77.5 AP, 77.5 TB, 79.5 C, 768